US 6,723,822 B2

(12) United States Patent
Shirai et al.

(10) Patent No.: US 6,723,822 B2
(45) Date of Patent: Apr. 20, 2004

(54) CRYSTALLINE POLYESTER

(75) Inventors: Eiji Shirai, Wakayama (JP); Katsutoshi Aoki, Wakayama (JP); Masayuki Maruta, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/105,322

(22) Filed: Mar. 26, 2002

(65) Prior Publication Data
US 2003/0040585 A1 Feb. 27, 2003

(30) Foreign Application Priority Data
Mar. 27, 2001 (JP) ........................................ 2001-091343

(51) Int. Cl.$^7$ ........................ C08G 63/123; C08G 63/18
(52) U.S. Cl. ........................ 528/195; 528/176; 528/302; 528/304; 525/444; 430/109
(58) Field of Search ................................ 528/195, 176, 528/302, 304

(56) References Cited

U.S. PATENT DOCUMENTS 4,330,670 A * 5/1982 Sublett .................... 528/302
6,383,705 B2 * 5/2002 Aoki ...................... 430/109 A

FOREIGN PATENT DOCUMENTS

JP         56-65146         6/1981

* cited by examiner

*Primary Examiner*—Patricia A. Short
(74) *Attorney, Agent, or Firm*—Birch, Stewart, Kolasch & Birch, LLP

(57) ABSTRACT

A crystalline polyester obtained by polycondensing monomers comprising 0.1 to 10% by mol of a divalent aromatic compound, wherein the crystalline polyester has a softening point of 85° to 150° C. The crystalline polyester can be suitably used for a resin binder for toner for electrophotography and the like used for developing electrostatic latent images formed in electrophotography, electrostatic recording method, electrostatic printing, and the like; a polyester resin composition comprising the crystalline polyester.

5 Claims, No Drawings

CRYSTALLINE POLYESTER

BACKGROUND OF THE INVENTION

1. Field of the Invention

The present invention relates to a crystalline polyester which can be suitably used for a resin binder for toner for electrophotography and the like used for developing electrostatic latent images formed in electrophotography, electrostatic recording method, electrostatic printing, and the like; a polyester resin composition comprising the crystalline polyester; a resin binder for toner comprising the crystalline polyester or the polyester resin composition; and a toner for electrophotography comprising the resin binder for toner.

2. Discussion of the Related Art

One of the major problems to be solved in electrophotographical methods is improvement in low-temperature fixing ability. A strategy for improving low-temperature fixing ability includes the use of a resin binder comprising a crystalline polyester, and a resin binder comprising a crystalline polyester and an amorphous polyester is reported.

Japanese Examined Patent Publication No. Sho 62-39428 discloses a toner comprising a crystalline polyester comprising an aromatic polycarboxylic acid component as an acid component in an amount of 50% by mol or more, and an amorphous polyester comprising an aromatic polycarboxylic acid component as an acid component in an amount of 60% by mol or more. However, the above-mentioned crystalline polyester is classified as the amorphous polyester by the definition according to the present invention. Even if the above-mentioned polyester can be a crystalline polyester, the crystalline polyester and the amorphous polyester are so compatible that a dispersed domain cannot be observed because the structures of the both polyesters are too similar. As a result, an excellent property as a crystalline polyester is not at all exhibited.

On the other hand, a crystalline polyester comprising an aliphatic diol as a main component is known. However, such polyester is poor in the compatibility with an amorphous polyester having a bisphenol A backbone which has excellent fixing ability and triboelectric properties, so that a satisfactory, appropriate dispersibility cannot be obtained under usual kneading conditions.

An object of the present invention is to provide a crystalline polyester which is appropriately compatible with an amorphous resin, especially an amorphous polyester having a bisphenol A backbone, and which can be suitably used for a resin binder for toner and the like.

In addition, another object of the present invention is to provide a polyester resin composition comprising the crystalline polyester, a resin binder for toner comprising the crystalline polyester or the polyester resin composition, and a toner for electrophotography comprising the resin binder for toner.

The above object and other objects of the present invention will be apparent from the following description.

SUMMARY OF THE INVENTION

The present invention relates to:
(1) a crystalline polyester obtained by polycondensing monomers comprising 0.1 to 10% by mol of a divalent aromatic compound, wherein the crystalline polyester has a softening point of 85° to 150° C.;
(2) a polyester resin composition comprising the crystalline polyester, and an amorphous resin obtained by polycondensing monomers comprising an aromatic compound having a bisphenol A backbone, wherein the aromatic compound having a bisphenol A backbone is contained in an amount of 40% by mol or more of an alcohol component;
(3) a resin binder for toner comprising the crystalline polyester or the polyester resin composition; and
(4) a toner for electrophotography comprising the resin binder for toner.

DETAILED DESCRIPTION OF THE INVENTION

The crystalline polyester of the present invention is prepared, like conventionally known polyesters, by polycondensing monomers comprising an alcohol component comprising a dihydric or higher polyhydric alcohol and a carboxylic acid component comprising a dicarboxylic or higher polycarboxylic acid compound. However, the crystalline polyester of the present invention, which has a softening point of 85° to 150° C., is a totally novel polyester in that a divalent aromatic compound, preferably a diol compound having a bisphenol A backbone is contained in the entire monomers in an amount of from 0.1 to 10% by mol, preferably from 0.5 to 7.5% by mol, more preferably from 1 to 5% by mol. The crystalline polyester of the present invention comprises an aromatic compound, in a small amount though, so that it is appropriately compatible with an amorphous resin comprising 40% by mol or more of an aromatic compound having a bisphenol A backbone of an alcohol component. Therefore, a polyester resin composition obtained by mixing the both exhibits excellent properties as a resin binder for toner.

Here, in the present invention, the term "crystalline" means that a ratio of the softening point to the maximum peak temperature of heat of fusion (softening point/maximum peak temperature of heat of fusion) is from 0.6 or more and less than 1.1, preferably from 0.9 or more and less than 1.1, more preferably from 0.98 to 1.05. Also, the term "amorphous" means that a ratio of the softening point to the maximum peak temperature of heat of fusion (softening point/maximum peak temperature of heat of fusion) is from 1.1 to 4.0, preferably from 1.5 to 3.0.

The divalent aromatic compound used as an alcohol component is preferably a diol compound having a bisphenol A backbone represented by Formula (I):

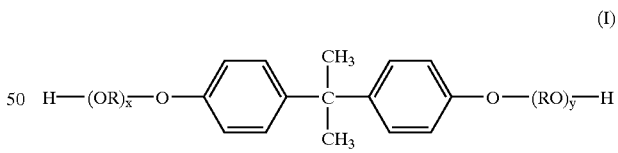

(I)

wherein R represents an alkylene group having 2 or 3 carbon atoms; x and y are a positive number; and the sum of x and y is 1 to 16, preferably 1.5 to 5.0. Concretely, the diol compound having a bisphenol A backbone includes an alkylene oxide adduct of bisphenol A such as polyoxypropylene(2.2)-2,2-bis(4-hydroxyphenyl)propane and polyoxyethylene(2.2)-2,2-bis(4-hydroxyphenyl)propane, and the like.

Also, a divalent aromatic compound used as a carboxylic acid component includes phthalic acid, isophthalic acid, terephthalic acid, and the like.

The monomers which are usable other than the above-mentioned divalent aromatic compound are exemplified below.

It is preferable that the alcohol component comprises aliphatic diols having 2 to 6 carbon atoms, preferably 4 to 6 carbon atoms.

The aliphatic diol having 2 to 6 carbon atoms includes 1,4-butanediol, ethylene glycol, 1,2-propylene glycol, 1,3-propylene glycol, 1,6-hexanediol, neopentyl glycol, 1,4-butenediol, 1,5-pentanediol and the like, among which a, ω-linear alkyl diol is more preferable.

The crystalline polyester of the present invention is obtained using the divalent aromatic compound in an amount of 0.1 to 10% by mol in the monomers. The divalent aromatic compound is not limited to either the alcohol or the carboxylic acid compound, and the compound may be a mixture of both. Therefore, the content of the monomers other than the divalent aromatic compound in each of the component cannot be absolutely determined, but it is desirable that the aliphatic diols having 2 to 6 carbon atoms are contained in the alcohol component in a total amount of 80% by mol or more, preferably from 90 to 100% by mol. Especially, it is desirable that one of the aliphatic diols constitutes 70% by mol or more, preferably 80% by mol or more, of the alcohol component.

Other divalent alcohol components include diethylene glycol, triethylene glycol, 1,8-octanediol, 1,4-cyclohexanedimethanol, dipropylene glycol, polyethylene glycol, polypropylene glycol, polytetramethylene glycol, hydrogenated bisphenol A, and the like.

The trihydric or higher polyhydric alcohol includes aromatic alcohols such as 1,3,5-trihydroxymethylbenzene; aliphatic alcohols such as sorbitol, 1,2,3,6-hexanetetrol, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane; cycloaliphatic alcohols such as 1,4-sorbitan; and the like.

As the carboxylic acid component, those comprising aliphatic dicarboxylic acid compounds having 2 to 6 carbon atoms, preferably 4 to 6 carbon atoms, especially preferably 4 carbon atoms are preferable.

The aliphatic dicarboxylic acid compound having 2 to 6 carbon atoms includes oxalic acid, malonic acid, maleic acid, fumaric acid, citraconic acid, itaconic acid, glutaconic acid, succinic acid, adipic acid, acid anhydrides thereof, alkyl (1 to 3 carbon atoms) esters thereof, and the like.

Although the content of the aliphatic dicarboxylic acid compounds having 2 to 6 carbon atoms cannot be absolutely determined, as in the aliphatic diols described above, it is desirable that the aliphatic dicarboxylic acid compounds having 2 to 6 carbon atoms are contained in the carboxylic acid component in a total amount of 80% by mol or more, preferably from 90 to 100% by mol. Especially, it is desirable that one of the aliphatic dicarboxylic acid compounds constitutes 70% by mol or more, preferably 80% by mol or more, of the carboxylic acid component.

A dicarboxylic acid component which may be contained in the carboxylic acid component other than the aliphatic dicarboxylic acid compound having 2 to 6 carbon atoms includes aliphatic carboxylic acids such as sebacic acid, azelaic acid, n-dodecylsuccinic acid and n-dodecenylsuccinic acid; cycloaliphatic carboxylic acids such as cyclohexanedicarboxylic acid; acid anhydrides thereof, alkyl (1 to 3 carbon atoms) esters thereof, and the like.

The tricarboxylic or higher polycarboxylic acid compound includes aromatic carboxylic acids such as 1,2,4-benzenetricarboxylic acid (trimellitic acid), 2,5,7-naphthalenetricarboxylic acid, 1,2,4-naphthalenetricarboxylic acid, and pyromellitic acid; aliphatic carboxylic acids such as 1,2,4-butanetricarboxylic acid, 1,2,5-hexanetricarboxylic acid, 1,3-dicarboxyl-2-methyl-2-methylenecarboxypropane, tetra(methylenecarboxyl)methane and 1,2,7,8-octanetetracarboxylic acid; cycloaliphatic carboxylic acids such as 1,2,4-cyclohexanetricarboxylic acid; derivatives thereof such as acid anhydrides thereof and alkyl (1 to 3 carbon atoms) esters thereof; and the like.

The polycondensation of the alcohol component with the carboxylic acid component can be carried out, for instance, by the reaction at a temperature of from 120° to 230° C. in an inert gas atmosphere, using an esterification catalyst and a polymerization inhibitor as occasion demands. Concretely, in order to enhance the strength of the resin, the entire monomers may be charged at once. Alternatively, in order to reduce the low-molecular weight components, divalent monomers are firstly reacted, and thereafter trivalent or higher polyvalent monomers are added and reacted. In addition, the reaction may be promoted by reducing the pressure of the reaction system in the second half of the polymerization. However, in the present invention, in order to have less effect of the aromatic compound on the properties of the crystalline polyester and to obtain the desired effects with a small amount of the aromatic compound, there is preferable a method of obtaining the crystalline polyester, by the steps comprising:

(a) firstly carrying out polycondensation using monomers other than the divalent aromatic compound;

(b) secondly adding the divalent aromatic compound to a reaction system of polycondensation in step (a) after a reaction ratio has reached to 50% or more, more preferably 80% or more, especially preferably 90% or more, and (c) further carrying out polycondensation. Here, the reaction ratio is obtained from the ratio (molar ratio) of the amount of water distilled off from the reaction system to the theoretical dehydration amount during polycondensation.

The crystalline polyester has a softening point of from 85° to 150° C., preferably from 90° to 140° C., especially preferably from 95° to 130° C. The maximum peak temperature of heat of fusion is preferably from 77° to 150° C., more preferably from 90° to 140° C., especially preferably from 110° to 130° C.

Further, a polyester resin composition suitably used as a resin binder for toner and the like can be prepared from the crystalline polyester of the present invention in combination with an amorphous resin obtained by polycondensing monomers comprising an alcohol component comprising an aromatic compound having a bisphenol A backbone.

The amorphous resin includes polyesters, polyester-polyamides, and the like. In the present invention, polyesters are preferable from the viewpoints of the fixing ability and the compatibility with the crystalline polyester.

The amorphous polyester is obtained by polycondensing monomers comprising a polyhydric alcohol component and a polycarboxylic acid component such as a carboxylic acid, a carboxylic acid anhydride and a carboxylic acid ester.

The compound having a bisphenol A backbone contained in the polyhydric alcohol component includes the same as those exemplified by the monomers for the crystalline polyester. The content of the compound having a bisphenol A backbone is preferably 40% by mol or more, more preferably from 60 to 100% by mol, especially preferably from 80 to 100% by mol, of the alcohol component from the viewpoints of the amorphousness, durability and triboelectric properties of the polyester.

An alcohol component other than the compound having a bisphenol A backbone includes ethylene glycol, propylene glycol, neopentyl glycol, glycerol, pentaerythritol, trimethylolpropane, hydrogenated bisphenol A, sorbitol, alkylene (2 to 3 carbon atoms) oxide (average number of moles: 1 to 10) adducts thereof, or the like. The polycarboxylic acid component includes dicarboxylic acids such as phthalic acid, isophthalic acid, terephthalic acid, fumaric acid and maleic acid; a substituted succinic acid of which substituent is an alkyl group having 1 to 20 carbon atoms or an alkenyl group having 2 to 20 carbon atoms, such as dodecenylsuccinic acid and octylsuccinic acid; trimellitic acid, pyromellific acid; acid anhydrides thereof, alkyl (1 to 3 carbon atoms) esters thereof; and the like.

The amorphous polyester can be prepared in the same manner as in the crystalline polyester.

It is desirable that the amorphous resin has a softening point of from 70° to 180° C., preferably from 100° to 160° C., a maximum peak temperature of heat of fusion of from 50° to 85° C., preferably from 60° to 75° C., a glass transition point of from 45° to 80° C., preferably from 55° to 75° C., and a weight percentage of component insoluble to chloroform of from 0 to 50% by weight. Incidentally, glass transition point is a physical property characteristic of an amorphous resin, and is discriminated from maximum peak temperature of heat of fusion.

The content of the crystalline polyester is preferably from 1 to 40% by weight, more preferably from 5 to 40% by weight, especially preferably from 10 to 35% by weight, of the polyester resin composition from the viewpoints of the storage property and the low-temperature fixing ability.

Generally, the compatibility between crystalline polyester and amorphous resin is low. When the backbones of a crystalline polyester and an amorphous resin are similar, the both become compatible so that the properties of the crystalline polyester are hardly exhibited. However, in the present invention, since the backbones of the crystalline polyester and the amorphous resin are different to some extent, the crystalline polyester is appropriately dispersed in the amorphous resin.

The crystalline polyester and polyester resin composition of the present invention can be suitably used as a resin binder for toner.

The toner for electrophotography comprising the crystalline polyester or polyester resin composition of the present invention can further contain in appropriate amounts additives such as colorants, charge control agents, releasing agents, electric conductivity modifiers, extenders, reinforcing fillers such as fibrous substances, antioxidants, antiaging agents, fluidity improvers, and cleanability improvers.

As the colorants, all of the dyes and pigments which are used as colorants for toners can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used for any of black toner, color toner and full-color toner. The content of the colorant is preferably from 1 to 10 parts by weight based on 100 parts by weight of the resin binder.

The charge control agents include positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid.

The releasing agents include natural waxes such as carnauba wax and rice wax; synthetic waxes such as polypropylene wax, polyethylene wax and Fischer-Tropsch wax; coal waxes such as montan wax, alcohol waxes, ester waxes, and the like. These waxes may be contained alone or in admixture of two or more kinds. Among these waxes, carnauba wax and polyethylene wax are preferable, from the viewpoint of the compatibility with the resin binder.

It is desirable that the melting point of the wax is the temperature lower than the softening point of the crystalline polyester, or the softening point of the crystalline polyester having the lowest softening point in the case where two or more crystalline polyesters are contained, by 10° C. or more, preferably 10° to 50° C. It is preferable that the content of the wax is from 0.5 to 10 parts by weight based on 100 parts by weight of the resin binder.

The toner of the present invention is preferably a pulverized toner, which is produced by a kneading-pulverization method or the like, comprising, for instance, homogeneously mixing a resin binder, a colorant, and the like in a mixer such as a ball-mill, thereafter melt-kneading with a closed kneader, a single-screw or twin-screw extruder or a continuous double roller kneader or the like, preferably with a closed kneader or a single-screw or twin-screw extruder, cooling, pulverizing and classifying the product. Further, a fluidity improver and the like may be added to the surface of the toner as occasion demands. The volume-average particle size of the resulting toner is preferably from 3 to 15 $\mu$m.

The softening point of the toner of the present invention is preferably from 90° to 150° C., more preferably from 120° to 145° C., from the viewpoints of the storage property and the fixing ability.

The toner for electrophotography of the present invention is used alone as a developer, in a case where the fine magnetic material powder is contained. Alternatively, in a case where the fine magnetic material powder is not contained, the toner may be used as a nonmagnetic one-component developer, or the toner can be mixed with a carrier and used as a two-component developer.

EXAMPLES

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Maximum Peak Temperature of Heat of Fusion and Glass Transition Point]

The maximum peak temperature of heat of fusion is determined using a differential scanning calorimeter ("DSC Model 210," commercially available from Seiko Instruments, Inc.), by raising its temperature to 200° C., cooling the hot sample to 0° C. at a cooling rate of 10° C./min., and thereafter heating the sample so as to raise the temperature at a rate of 10° C./min. In addition, the glass transition point refers to the temperature of an intersection of the extension of the baseline of equal to or lower than the maximum peak temperature and the tangential line showing the maximum inclination between the kickoff of the peak and the top of the peak by the determination mentioned above.

[Dispersibility of Crystalline Polyester]

The amount 0.1 g of toner is spread on a water slide glass (thickness: 1 mm, width: 26 mm, length: 76 mm), and excess toner was removed by gently shaking the slide to an extent that the toner can be observed as individual particles. The slide glass is placed on a hot plate at 200° C., and allowed to stand for 1 minute. Thereafter, the toner on the slide glass is observed at a magnification of 2000 using a microscope "KEYENCE VH-5910•SONY COLOR VIDEO PRINTER." The dispersion diameter of the crystalline polyester is analyzed by an image analyzer "LOOZEX (III)" (commercially available from NIRECO K.K.), and the dispersibility of the crystalline polyester is evaluated based on the following evaluation criteria. Incidentally, the dispersed domain refers to a domain having a diameter of 0.05 μm or more. In the case where the dispersed domain is elliptical, an average value of lengths of the major axis and the minor axis is defined as a diameter.

(Evaluation Criteria)

1: Less than 90% by area of the dispersed domain is occupied by a crystalline polyester having a diameter of 2 μm or less.
2: Ninety percent by area or more of the dispersed domain is occupied by a crystalline polyester having a diameter of from 0.1 to 2 μm, and the dispersed domain having a diameter of from 0.1 to 1 μm is composed of less than 50% by area.
3: Ninety percent by area or more of the dispersed domain is occupied by a crystalline polyester having a diameter of from 0.1 to 2 μm, and the dispersed domain having a diameter of from 0.1 to 1 μm is composed of 50% by area or more and less than 90% by area.
4: Ninety percent by area or more of the dispersed domain is occupied by a crystalline polyester having a diameter of from 0.1 to 1 μm.
5: Ninety percent by area or more of the dispersed domain is occupied by a crystalline polyester having a diameter of 2 μm or less, and the dispersed domain of the crystalline polyester having a diameter of less than 0.1 μm is composed of exceeding 10% by area, or the dispersed domain is not able to be confirmed.

Preparation Example 1 of Crystalline Polyester

A 5-liter four-necked flask equipped with a nitrogen inlet tube, a dehydration tube, a stirrer, and a thermocouple was charged with raw material monomers shown in Table 1 except for BPA-PO, and 2 g of hydroquinone, and the ingredients were reacted at 160° C. over a period of 5 hours. Thereafter, the temperature was raised to 200° C., and the ingredients were reacted for 1 hour and further reacted at 8.3 kPa for 1 hour. The reaction ratio was 98%. Next, the reaction system was changed back to normal pressure, and BPA-PO was added. The ingredients were reacted for 1 hour, and further reacted at 8.3 kPa for 1 hour. The resulting resin is referred to as Resin a.

Preparation Example 2 of Crystalline Polyester

A 5-liter four-necked flask equipped with a nitrogen inlet tube, a dehydration tube, a stirrer, and a thermocouple was charged with each set of raw material monomers shown in Tables 1 and 2, and 2 g of hydroquinone, and the ingredients were reacted at 160° C. over a period of 5 hours. Thereafter, the temperature was raised to 200° C., and the ingredients were reacted for 1 hour and further reacted at 8.3 kPa for 1 hour. The resulting resins are referred to as Resins b to h.

TABLE 1

| | Resin a | | Resin b | | Resin c | | Resin d | | Resin e | |
|---|---|---|---|---|---|---|---|---|---|---|
| | Used Amount | mol % | Used Amount | mol % | Used Amount | mol % | Used Amount | mol % | Used Amount | mol % |
| Alcohol Component | | | | | | | | | | |
| 1,4-Butanediol | 1013 g | 86 | 1013 g | 86 | 1013 g | 90 | 1013 g | 90 | 1013 g | 90 |
| 1,6-Hexanediol | 143 g | 9 | 143 g | 9 | 143 g | 10 | 143 g | 10 | 143 g | 10 |
| BPA-PO[1] | 218 g | 5 | 218 g | 5 | | | | | | |
| Acid Component | | | | | | | | | | |
| Fumaric Acid | 1450 g | 100 | 1450 g | 100 | 1378 g | 95 | 1305 g | 90 | 1160 g | 80 |
| Terephthalic Acid | | | | | 104 g | 5 | 208 g | 10 | 416 g | 20 |
| Content of Aromatic Compound in Entire Monomers (mol %) | 2.4 | | 2.4 | | 2.5 | | 5.1 | | 9.9 | |
| Softening Point (° C.) | 121.1 | | 113.1 | | 112.6 | | 104.7 | | 90.3 | |
| Maximum Peak Temperature (° C.) of Heat of Fusion | 124.3 | | 115.8 | | 114.3 | | 110.3 | | 98.2 | |
| Softening Point/ Peak Temperature | 0.97 | | 0.98 | | 0.99 | | 0.95 | | 0.92 | |

Note mol % represents a molar fraction of each of the alcohol component or the acid component.

[1] Propylene oxide adduct of bisphenol A (average number of moles added: 2.2 moles)

TABLE 2

|  | Resin f | | Resin g | | Resin h | | Resin B | |
| --- | --- | --- | --- | --- | --- | --- | --- | --- |
|  | Used Amount | mol % | Used Amount | mol % | Used Amount | mol % | Used Amount | mol % |
| Alcohol Component | | | | | | | | |
| 1,4-Butanediol | 1013 g | 90 |  |  | 1013 g | 90 | 1013 g | 90 |
| 1,6-Hexanediol | 71.5 g | 5 | 1359 g | 95 | 143 g | 10 | 143 g | 10 |
| BPA-PO[1)] | 218 g | 5 | 218 g | 5 |  |  |  |  |
| Acid Component | | | | | | | | |
| Fumaric Acid | 1378 g | 95 | 2071 g | 100 | 1450 g | 100 | 1015 g | 70 |
| Terephthalic Acid | 104 g | 5 |  |  |  |  | 624 g | 30 |
| Content of Aromatic Compound in Entire Monomers (mol %) | 4.9 | | 2.0 | | 0 | | 14.9 | |
| Softening Point (° C.) | 102.3 | | 81.2 | | 122.0 | | 63.3 | |
| Maximum Peak Temperature (° C.) of Heat of Fusion | 110.5 | | 84.5 | | 124.6 | | 42.5 | |
| Softening Point/ Peak Temperature | 0.93 | | 0.96 | | 0.98 | | 1.49 | |

Note
mol % represents a molar fraction of each of the alcohol component or the acid component.
[1)]Propylene oxide adduct of bisphenol A (average number of moles added: 2.2 moles)

Preparation Example 1 of Amorphous Resin

A 5-liter four-necked flask equipped with a nitrogen inlet tube, a dehydration tube, a stirrer, and a thermocouple was charged with raw material monomers shown in Table 3, and 4 g of dibutyltin oxide, and the ingredients were reacted at 220° C. over a period of 8 hours. Thereafter, the ingredients were further reacted at 8.3 kPa until the softening point shown in Table 3 was attained. The resulting resin is referred to as Resin A.

TABLE 3

|  | Resin A |
| --- | --- |
| BPA-PO[1)] | 2000 g |
| BPA-EO[2)] | 800 g |
| Terephthalic Acid | 600 g |
| Dodecenylsuccinic Anhydride | 500 g |
| Fumaric Acid | |
| Softening Point (° C.) | 150 |
| Maximum Peak Temperature (° C.) of Heat of Fusion | 66 |
| Glass Transition Point (° C.) | 62.3 |
| Softening Point/Peak Temperature | 2.27 |

[1)]Propylene oxide adduct of bisphenol A (average number of moles added: 2.2 moles).
[2)]Ethylene oxide adduct of bisphenol A (average number of moles added: 2.2 moles).

Preparation Example 2 of Amorphous Resin

A 5-liter four-necked flask equipped with a nitrogen inlet tube, a dehydration tube, a stirrer, and a thermocouple was charged with raw material monomers shown in Table 2, and 2 g of hydroquinone, and the ingredients were reacted at 160° C. over a period of 5 hours. Thereafter, the temperature was raised to 200° C., and the ingredients were reacted for 1 hour and further reacted at 8.3 kPa for 1 hour. The resulting resin is referred to as Resin B.

Examples 1 to 3

A resin binder, a colorant, a charge control agent and a releasing agent, as shown in Table 4, were sufficiently mixed together with a Henschel mixer. Thereafter, the mixture was melt-kneaded with a twin-screw extruder, cooled and roughly pulverized. Subsequently, the resulting product was pulverized with a jet mill and classified, to give a powder having a volume-average particle size of 7.5 µm. To 100 parts by weight of the resulting powder was added 1.0 part by weight of "AEROSIL R-972" (commercially available from Nippon Aerosil) as an external additive, and mixed with a Henschel mixer, to give a toner. The softening point of the resulting toner and the dispersibility of the crystalline polyester are shown in Table 5.

TABLE 4

| Example | Resin Binder | Colorant | Charge Control Agent | Releasing Agent |
| --- | --- | --- | --- | --- |
| 1 | a/A = 20/80 | MOGUL-L = 4 | T-77 = 1 | Carnauba = 1 |
| 2 | a/A = 20/80 | ECB-301 = 4 | LR-147 = 1 | Carnauba = 1 |
| 3 | a/A = 20/80 | MOGUL-L = 4 | T-77 = 1 | SP-105 = 1 |

Note
The used amount is expressed in parts by weight.
MOGUL-L: carbon black (commercially available from Cabot Corporation)
ECB-301: blue pigment (commercially available from DAINICHISEIKA COLOR & CHEMICALS MFG. CO., LTD.)
T-77: negatively chargeable charge control agent (commercially available from Hodogaya Chemical Co., Ltd.)
LR-147: negatively chargeable charge control agent (commercially available from Japan Carlit)
Carnauba (Carnauba Wax CI): natural wax (commercially available from K. K. Kato Yoko)
SP-105 (SPRAY 105): polyethylene wax (commercially available from Sazole)

Examples 4 to 9 and Comparative Examples 1 to 4

The same procedures as in Example 1 were carried out except that a resin binder shown in Table 5 was used, to give a toner. The softening point of the resulting toner and the dispersibility of the crystalline polyester are shown in Table 5.

Test Example 1

Storage Property

Four grams of a toner was allowed to stand under environmental conditions of a temperature of 45° C. and a humidity of 60% for 72 hours. The extent of the aggregation of the toner was visually determined, and the storage property was evaluated by the following evaluation criteria. The results are shown in Table 5.

[Evaluation Criteria]

⊚: No aggregation being observed.

○: Substantially no aggregation being observed; and

×: Aggregation being observed.

Test Example 2

Low-Temperature Fixing Ability

Four parts by weight of a toner and 96 parts by weight of a silicon-coated ferrite carrier (commercially available from Kanto Denka Kogyo Co., Ltd., average particle size: 90 μm) were mixed for 10 minutes with a turbuler mixer, to give a developer. Next, the resulting developer was loaded in a modified apparatus of a copy machine "AR-505" (commercially available from Sharp Corporation). The development of fixed images was carried out, with sequentially raising the temperature of the fixing roller from 90° to 240° C.

A sand-rubber eraser to which a load of 500 g was applied, the eraser having a bottom area of 15 mm×7.5 mm, was moved backward and forward five times over a fixed image obtained at each fixing temperature. The optical reflective density of the image before or after the eraser treatment was measured with a reflective densitometer "RD-915" manufactured by Macbeth Process Measurements Co. The temperature of the fixing roller at which the ratio of the optical density after the eraser treatment to the optical density before the eraser treatment initially exceeds 70% is defined as the lowest fixing temperature. The low-temperature fixing ability was evaluated by the following evaluation criteria. The results are shown in Table 5.

[Evaluation Criteria]

⊚: A lowest fixing temperature being lower than 130° C.;

○: A lowest fixing temperature being 130° C. or higher and lower than 150° C.; and ×: A lowest fixing temperature being 150° C. or higher.

Test Example 3

Evenness of Fixed Image

The same procedures were carried out as in Test Example 2 except that the fixing temperature was set at 200° C. A solid image of 5 cm×12 cm was printed at an average image density of 1.4 (measured with a reflective densitometer "RD-915" manufactured by Macbeth Process Measurements Co.), and image densities were measured at 10 points in the image. The more the unevenness of the triboelectric charges, the larger the variance of the image densities between the measured points, so that the resulting image quality is deteriorated. The evenness of fixed images is evaluated by the following evaluation criteria. The results are shown in Table 5.

[Evaluation Criteria]

The difference between the maximum value and the minimum value of the image densities measured is:

⊚: less than 0.2;

○: 0.2 or more and less than 0.4; and

×: 0.4 or more.

TABLE 5

| | Resin Binder | Softening Point of Toner (° C.) | Dispersibility | Storage Property | Low-Temperature Fixing Ability | Evenness of Fixed Image |
|---|---|---|---|---|---|---|
| Ex. No. | | | | | | |
| 1 | a/A = 20/80 | 141.3 | 4 | ⊚ | ⊚ | ⊚ |
| 2 | a/A = 20/80 | 141.5 | 4 | ⊚ | ⊚ | ⊚ |
| 3 | a/A = 20/80 | 141.7 | 4 | ⊚ | ⊚ | ⊚ |
| 4 | b/A = 20/80 | 140.2 | 3 | ⊚ | ○ | ⊚ |
| 5 | c/A = 20/80 | 140.7 | 2 | ⊚ | ○ | ○ |
| 6 | d/A = 20/80 | 140.5 | 3 | ⊚ | ○ | ⊚ |
| 7 | e/A = 20/80 | 139.2 | 4 | ○ | ○ | ⊚ |
| 8 | f/A = 20/80 | 140.5 | 3 | ⊚ | ○ | ⊚ |
| 9 | a/A = 35/65 | 137.2 | 3 | ○ | ⊚ | ○ |
| Comp. Ex. No. | | | | | | |
| 1 | h/A = 20/80 | 141.3 | 1 | ⊚ | ○ | × |
| 2 | B/A = 20/80 | 138.7 | 4 | × | ○ | ○ |
| 3 | g/A = 20/80 | 136.3 | 3 | × | ○ | ○ |
| 4 | A = 100 | 145.6 | — | ⊚ | × | ⊚ |

Note
The amount of resin used is expressed in parts by weight.

It is clear from the above results that the toners of Examples in which a crystalline polyester is appropriately dispersed are excellent in any of the storage property, low-temperature fixing ability and image quality. On the other hand, in the toner of the Comparative Example 1 in which a crystalline polyester containing no aromatic compound is used, the dispersibility of the crystalline polyester is insufficient, so that the toner is poor in the evenness of fixed image. Each of the toner of Comparative Example 2 in which a combination of amorphous resins is used, the toner of Comparative Example 3 in which a crystalline polyester having a low softening point is used, and the toner of Comparative Example 4 in which a large amount of a crystalline polyester is contained is poor in the storage property, and the toner of Comparative Example 5 in which only an amorphous polyester is used as a resin binder is poor in the low-temperature fixing ability.

According to the present invention, there can be provided a crystalline polyester which is appropriately compatible with an amorphous resin and can be suitably used as a resin binder for toner. Further, there can be provided a polyester resin composition comprising the crystalline polyester and a specified amorphous resin, a resin binder for toner comprising the composition, and a toner for electrophotography comprising the resin binder.

What is claimed is:

1. A crystalline polyester obtained by polycondensing monomers comprising 0.1 to 10% by mol of a divalent aromatic compound comprising a diol compound having a bisphenol A backbone, wherein the crystalline polyester has a softening point of 850° to 150° C.

2. The crystalline polyester according to claim 1, wherein the crystalline polyester is obtained by the steps comprising:
   (a) firstly carrying out polycondensation using monomers other than the divalent aromatic compound;
   (b) secondly adding the divalent aromatic compound to a reaction system of polycondensation in step (a) after a reaction ratio has reached to 50% or more; and
   (c) further carrying out polycondensation.

3. The crystalline polyester according to claim 1, wherein the monomers further comprise at least one compound selected from the group consisting of aliphatic diols having 2 to 6 carbon atoms as an alcohol component and aliphatic dicarboxylic acid compounds having 2 to 6 carbon atoms as a carboxylic acid component.

4. A process for preparing a crystalline polyester of claim 1 comprising the steps comprising:
   (a) firstly carrying out polycondensation using monomers other than a divalent aromatic compound;
   (b) secondly adding the divalent aromatic compound to a reaction system of polycondensation in step (a) after a reaction ratio has reached to 50% or more; and
   (c) further carrying out polycondensation.

5. A resin binder for toner comprising the crystalline polyester of claim 1.

* * * * *